United States Patent [19]

Legiec et al.

[11] Patent Number: 5,282,938

[45] Date of Patent: Feb. 1, 1994

[54] PROCESS FOR RECOVERY OF TRACE METALS AND SALTS FROM WASTE COMBUSTION RESIDUES

[76] Inventors: Irene Legiec, 107 Valley Stream Dr., Newark, Del. 19702; David S. Kosson, 38 Whitby Cir., Somerset, N.J. 08873; Jean-Luc Ontiveros, 1418 Valbrook Ct. N., Bel Air, Md. 21015; Tracey L. Clapp, 912 Woodbridge Commons Way, Iselin, N.J. 08830

[21] Appl. No.: 835,601

[22] Filed: Feb. 13, 1992

[51] Int. Cl.$^5$ .............................................. C25C 1/00
[52] U.S. Cl. ........................... 204/105 R; 204/109; 204/114; 204/117; 423/98; 423/109; 423/157; 423/150; 423/53; 423/155; 423/27; 423/131
[58] Field of Search .......... 204/114, 117, 109, 105 R; 423/109, 157, 150, 98, 53, 155, 27, 131

[56] References Cited

PUBLICATIONS

Legiec et al., Environmental Progress, Aug. 1989, vol. 8, No. 3, pp. 212-216.
Kosson et al., Solid Waste Combustion Residuals Utilization Conference, Oct. 13-14, 1988.
Legiec et al., Proceedings: Third International Conference on New Frontiers for Hazardous Waste Management, Sep., 1989, 253-261.
Legiec et al., International Conference on Municipal Waste Combustion, Apr., 1989.

*Primary Examiner*—John Niebling
*Assistant Examiner*—C. Delacroix-Muirheid
*Attorney, Agent, or Firm*—Klauber & Jackson

[57] ABSTRACT

A method for the continuous treatment of air pollution control residues from various resource recovery systems whereby the air pollution control residue is treated with a dilute salt extracting solution at a pH chosen to maximize the recovery of lead, for a reaction time chosen to maximize the recovery of lead, and for a number of recycles chosen to maximize the recovery of lead from the particular residue being treated. Other metals and dissolved salts can also be recovered from the extracting solution. Thus by monitoring these three variables for each batch of residue, and adjusting the extracting solution accordingly, residue from various sources and of varying composition can be treated efficiently and continuously to remove hazardous metals and dissolved salts from the residue. Bottom residue fines, alone or admixed with air pollution control residues, can also be treated in accordance with the process of the invention.

7 Claims, 12 Drawing Sheets 5,282,938

PROCESS FOR RECOVERY OF TRACE METALS AND SALTS FROM WASTE COMBUSTION RESIDUES

This invention relates to the recovery of metals from solid waste materials. More particularly, this invention relates to a process for the efficient recovery of metals and salts from incinerator residues in a continuous manner.

BACKGROUND OF THE DISCLOSURE

Landfills have been the traditional waste disposal route for waste materials, including household waste and industrial waste. In the course of time many of the waste materials are degraded. However, with the huge increase in disposable packaging and disposable products presently available, the volume of waste materials to be disposed of has increased rapidly, and landfills, particularly in heavily populated areas, are filling rapidly with the increase in demand and new landfills are not being developed at a rate in keeping with the increased capacity needed. Further, the degradation process produces many compounds, such as salts, and elements, including hazardous metals, that can contaminate ground water supplies underlying the landfills.

Thus, alternatives to landfills have been investigated for some years. Recycling materials such as plastics, paper, metal cans and glass is feasible, and is being widely implemented. This reduces somewhat the volume of materials to be placed in landfills. However, the economies of recycling are not always attractive, and many communities have not yet embraced recycling because it is more expensive than landfills. Further, since recycling depends upon the average citizen for implementation, there are problems in gaining widespread compliance.

Another method of waste disposal is incineration. Incineration can reduce solid waste 90% by volume and 75% in mass, which is very attractive. However, incineration requires high temperatures to completely break down organic materials, and the gases generated must be scrubbed carefully to remove particulates and incompletely combusted organic materials to prevent them from entering the atmosphere. Thus, modern incineration units contain two combustion zones, a primary zone where solid wastes are burnt, producing bottom residues, and a secondary zone to complete the combustion and scrubbing of gases, producing air pollution control residue. The resultant completely combusted and scrubbed gases are cooled in heat recovery units, such as boilers and economizers, to produce steam, which in turn can be sold or sent to a turbine to produce electricity. These incinerators are known as resource recovery systems because they convert waste materials into energy.

Although the basic concept of resource recovery is highly attractive, these resource recovery systems have met with mixed success to date. There is widespread opposition to them on the part of local citizens, due to fears, well founded or not, that hazardous materials will be vented into the atmosphere.

In order to promote wider acceptance of these systems, they have been modified to improve scrubbing of flue or vent gases and to improve removal of particulates. More modern recovery incinerators use lime scrubbers and use various pollution control devices such as electrostatic precipitators and baghouses to remove acid gases and particulates.

Both types of residue produced in these incinerators contain heavy metals and salts. Bottom residue contains the heavier residues retained on the primary combustion grates, which include uncombusted materials such as metal pipe fragments, glass fragments and the like, as well as fragments from incompletely combusted combustible materials. Air pollution control residue is lighter particulate matter recovered from secondary combustion grates, and flue gas scrubbers, and they contain most of the more volatile and hazardous metals such as chromium, cadmium and lead, as well as various salts. These residues still must be deposited in landfills, with its concomitant leaching problems.

Studies have shown that the amount of metals such as chromium, cadmium and lead present in air pollution control residue from resource recovery units can exceed the standards set by the Environmental Protection Agency for disposal of hazardous waste materials.

In addition, the residues contain high amounts of soluble salts such as chlorides and sulfates. These materials are of concern because they too will leach into ground water, producing water with high dissolved salt residues, further contaminating water supplies.

Thus, it is now desirable and may become necessary to remove hazardous metals and salts from air pollution control residues before exporting the residue to landfills. The resultant non-toxic residue may be able to be reused by mixing with other solids, such as roadbed materials, further lessening the burden on landfills.

A method then of removing metals such as chromium, cadmium and lead from air pollution control residue and bottom residue, and soluble salts, prior to landfill disposal, that is feasible and inexpensive, would be highly desirable. However, a major problem in treating incinerator residues is the wide variation in the nature of the metals present in a particular residue, as well as their concentration, and the relative amounts of soluble salts present, depending on the incinerator source. The residues also vary in composition and characteristics from one batch to another from the same incinerator due to the variations in waste feedstock materials. These variations make it difficult to treat incinerator residues obtained at various times and/or from various sources in an efficient and continuous manner.

Thus, a method of treating incinerator residues from various sources and containing variations in metal and salt concentrations in a continuous and economical manner to produce residues that are environmentally safe would be highly desirable.

SUMMARY OF THE INVENTION

The present invention provides an economic continuous process for the recovery of hazardous metals from incinerator residues. Metals and salts can be removed from air pollution control residues by extracting them with a buffered salt solution, and recovering the metals and salts from the solution. In order to continuously treat residues of variable composition and characteristics due to variations of sources or waste feedstocks, a determination of only three variables for each batch of residue is made; 1) the optimum pH to maximize lead extraction of a particular residue is determined, 2) the optimum reaction time at the optimum pH to maximize the lead extraction is determined, and 3) the optimum process recycle ratio to maximize the removal of lead and other metals and salts with minimum secondary waste production and cations is established. After extraction, soluble salts and metals can be recovered from the extractant solution. The processed residue particulates, from which hazardous metals and salts have been removed in accordance with the present process, can be disposed of in traditional landfills without danger of hazardous metals or excess soluble salts leaching into ground water supplies. The metals and salts may be recovered in reusable form.

DETAILED DESCRIPTION OF THE INVENTION

Figure 1:
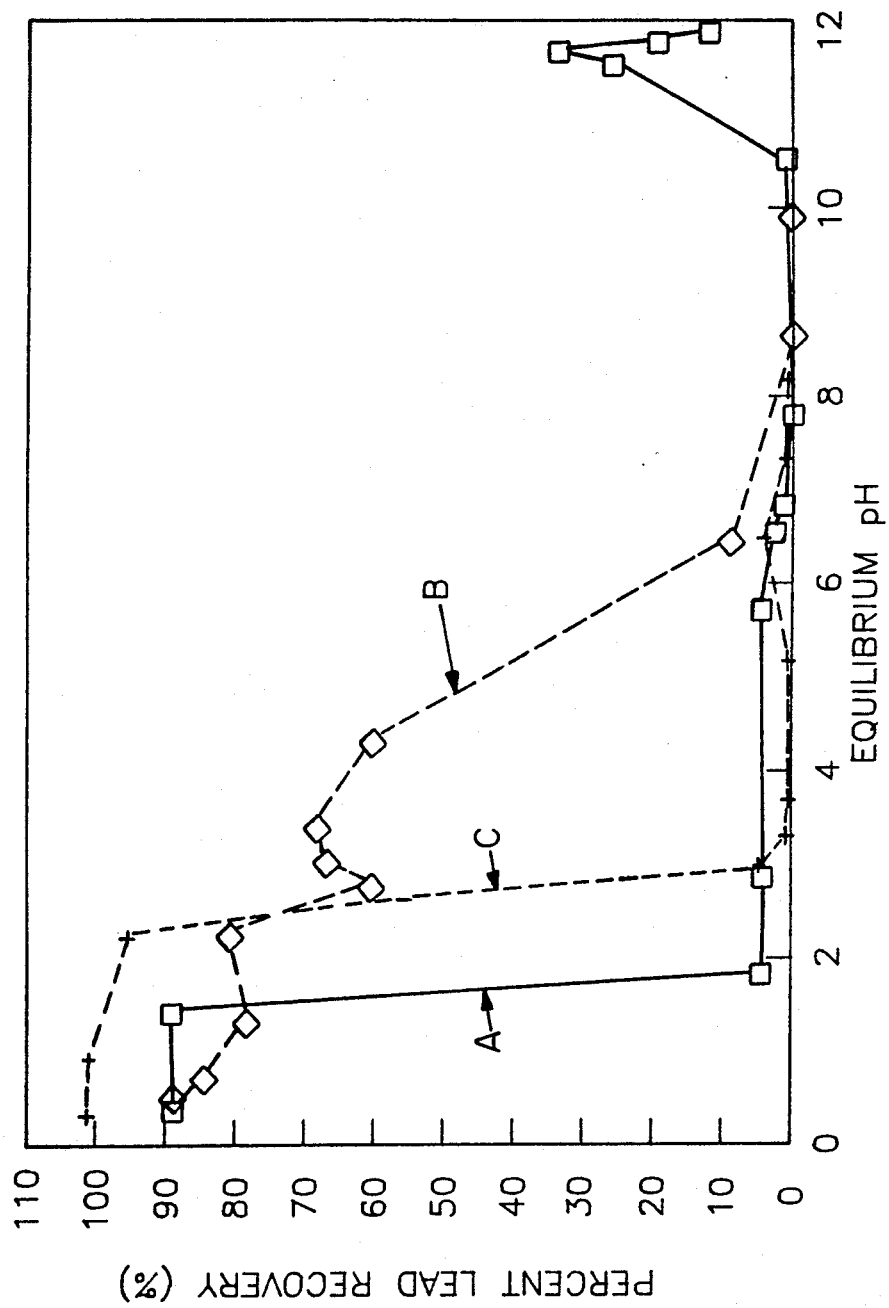
FIG. 1 is a graph of percent lead recovery versus pH for air pollution control residues or scrubber residues.

Present day resource recovery systems produce residues containing high amounts of cadmium and lead, as well as other metals such as chromium. Very high levels of lead are found also in bottom residues. These hazardous metals are desirably removed before depositing the residues in landfills to prevent future potential release and consequent contamination of ground water. The metals are present both in soluble and insoluble salt form, but it has been found that major amounts of the metals are able to be extracted from the residue by proper choice of pH, reaction time and acid concentration of the extracting solution. For example, all of the cadmium present in both bottom residue and air pollution control residues is available for extraction, about 52% of the lead and about 50% of total aluminum, cobalt, nickel and zinc from bottom residue. In air pollution control residue, 70% of the cobalt and zinc are extractable, as is 62% of the lead, 46% of the nickel, 33% of the aluminum and copper and 16% of the chromium.

In addition to treating air pollution control residue, fines from bottom residue can also be treated in accordance with the present process.

Modern resource recovery systems utilize a lime slurry (CaO) scrubber for flue gases. This produces residues with a high calcium content and consequently other cations, such as hazardous metals, are present in lesser amounts by weight, which further exacerbates the hazardous metal recovery.

It has been found that by measuring only three variables, the pH, the reaction time and the number of recycles, and optimizing these variables to maximize the recovery of lead, other metals and salts of residues from different sources are also recoverable, and residues having widely variable composition can be treated in an efficient and continuous process.

The continuous extraction process utilized herein comprises:

a) extracting air pollution control residues in a suitably buffered acid solution at the optimum pH and for the optimum reaction time to form a slurry, b) filtering the slurry to separate out the extracted solids from the extraction solution, and c) recycling the extraction solution to treat additional residues. The extraction solution is recycled at a predetermined recycle ratio. Prior to recycling, the extractant solution can be electrochemically plated or extracted (liquid/liquid extraction) to sequentially remove dissolved lead and other metals. Dissolved salts can be recovered from the extractant solution periodically by drying a portion of the extracting solution, thereby producing recoverable soluble salt solids.

The metal extracting solution is a dilute salt solution, e.g. about 1N, that has been acidified to the optimum pH.

Salt solutions that can be employed in the present process include the alkali metal chlorides and acetates. Preferably the salt solution is sodium chloride, which is inexpensive. The salt solution is then acidified with an acid, such as hydrochloric acid. The exact pH and acid concentration of the salt solution will vary depending on the composition and character of the residue to be treated and is determined as the pH which maximizes recovery of lead in the extracting solution. The pH and salt concentration are adjusted as required during treatment of each batch of residue so as to carry out the extraction at the optimum pH.

Typical recoveries of metals utilizing the above metal extracting solution range from about 70-85% of available lead and up to 95% of the available cadmium present in air pollution control residues.

Trace levels of metals such as cadmium and chromium can be rapidly extracted from fine air pollution control residues, i.e., in about 10 minutes of stirring. However, metals such as lead, which are found in higher concentration, can take up to 100 minutes to reach an equilibrium state. Thus, the optimum time for extraction of all the heavy metals is taken as that time required to maximize the recovery of lead. The optimum reaction time for a particular residue product to be treated is determined at the optimum pH and acid concentration of the extractant solution, as has been predetermined.

The optimum number of recycles is determined by monitoring sequential batch extraction at the optimum pH and optimum reaction time to observe the solubility limit interference of salt and metals and to determine the optimum number of recycles and hence, recycle ratio, to maximize extraction of lead and dissolved salts. By operating at these parameters, batch to batch variations of the residue to be treated is compensated for, and a continuous treatment plant becomes feasible.

After extracting for the predetermined reaction time at the predetermined pH, the residue solids are separated from the extracting solution, as by sedimentation or vacuum filtration. The residue solids, now free of soluble trace hazardous metals and soluble salts, can be disposed of without fear of contaminating the environment.

The extracting solution is now either recycled to extract more air pollution control residues for the predetermined number of cycles, or directly treated by electrochemical means to plate out the heavy metals. Since electroplating requires a certain minimum concentration of each metal in the solution, the electroplating of a particular metal will be performed after the extractant solution has reached at least that concentration of that metal. As is usually the case, the metal content of air pollution control residues varies widely, depending on the feedstock material incinerated. Thus, the extracting solution can be treated to remove any cation that is present in sufficient concentration. Since the extracting solution is continuously recycled to extract additional residues, other metal cations remain in the extracting solution until a sufficient concentration builds up in the solution to allow electrochemical isolation of that metal. Lead is usually found in high concentrations, particularly in modern incinerators, and thus the lead generally can be removed after about 1-4 extraction cycles. The electroplating recovery method ensures that lead of quite high purity is obtained, and the metals are obtained in reusable form.

After trace metal removal, the extracting solution, or a portion thereof, is transported to dryers. Again, depending upon their concentration in the extracting solution, soluble salts are also removed from the extracting solution. The water can be recycled to the extracting solution. The soluble salts precipitate out and are collected. These salts contain only trace amounts of hazardous metals and can be disposed of safely, or otherwise recycled.

In addition to treating air pollution control residues, the present process can be modified to treat fines from bottom residues as well, or a combined mixture of bottom and air pollution control residues. After incineration, the bottom residue is coated with a layer of finely divided particles or fines which can also be treated by the extracting solution described hereinabove. The finely divided particles can be separated from the larger particles of the bottom residue by screening and agitation in water, which separates the fines from the larger particles. The water containing the fines is separated from the remaining bottom residue, as by decanting, and may be filtered to recover the finely divided particles. These bottom residue fines, filtered or in a slurry, can be combined with air pollution control residue and treated in accordance with the process of the present invention.

In order to recover all soluble salts from bottom residue as well as air pollution control residue, the bottom residue or mixed bottom and air pollution control residue can be leached with an aqueous solution having a basic pH of 8-9. Additional soluble salts, particularly calcium salts present in high amounts after lime scrubbing of the flue gases, can be recovered by filtering the basic extractant solution and disposing of the bottom residue solids. The solution is then either dried to recover the soluble salts, or recycled to the air pollution control residue extracting solution. However, this will require the addition of increased amounts of acid to neutralize the basic residue. This may adversely impact the economics of the process, but will result in a further reduction in landfill volume, with its potential for release of salts which may contaminate ground water, and an increase in total recyclables. The present process will also permit use of residue utilization technologies (e.g., incorporation into cement block) which are intolerant of soluble salts.

The process of the invention can be carried out by treating various batches of residue sequentially, or residues from different sources and/or different periods may be admixed together to prepare larger batches of residue having a homogeneous composition.

The invention will be further illustrated by the following examples, but the invention is not meant to be limited to the details described therein. In the examples, parts and percentages are by weight.

In the Examples, total dissolved solids was measured by placing a known quantity of sample in an oven at 105° C. for 24 hours and determining the weight of the residue.

Metal ion concentration in liquid samples was measured by atomic adsorption spectrophotometry.

Anion concentration was determined by indirect ultraviolet detection at 280 nm using liquid chromatography.

EXAMPLE 1

Determination of Optimum pH

Residue from three different incinerator sources, designated as A, B and C, were tested. Hydrochloric acid was added batchwise to thirteen separate samples of 10 grams of air pollution control residue and diluted to 100 ml with 1N sodium chloride solution to obtain an equilibrium pH range of the sample slurries from a pH of less than 1 to pH 12.

Extractions of the residue samples were carried out by agitating the mixtures for 24 hours. The residue was vacuum filtered and the extracts were analyzed for pH and metals, and the percent recovery of lead determined.

FIG. 1 is a graph of lead recovery versus pH. It is apparent that sample A has an optimum extraction solution pH of 2, whereas samples B and C are best operated at a pH of 3.

EXAMPLE 2

Determination of Optimum Reaction Time

The optimum reaction time at the optimum pH as determined in Example 1 was determined for the three samples of Example 1.

Ten grams of air pollution control residue and 200 ml of the extract solution (pH 2 for sample A and pH 3 for samples B and C) were shaken for eight different time periods. At the end of each time period the residue was vacuum filtered and lead extraction was measured.

Figure 2:
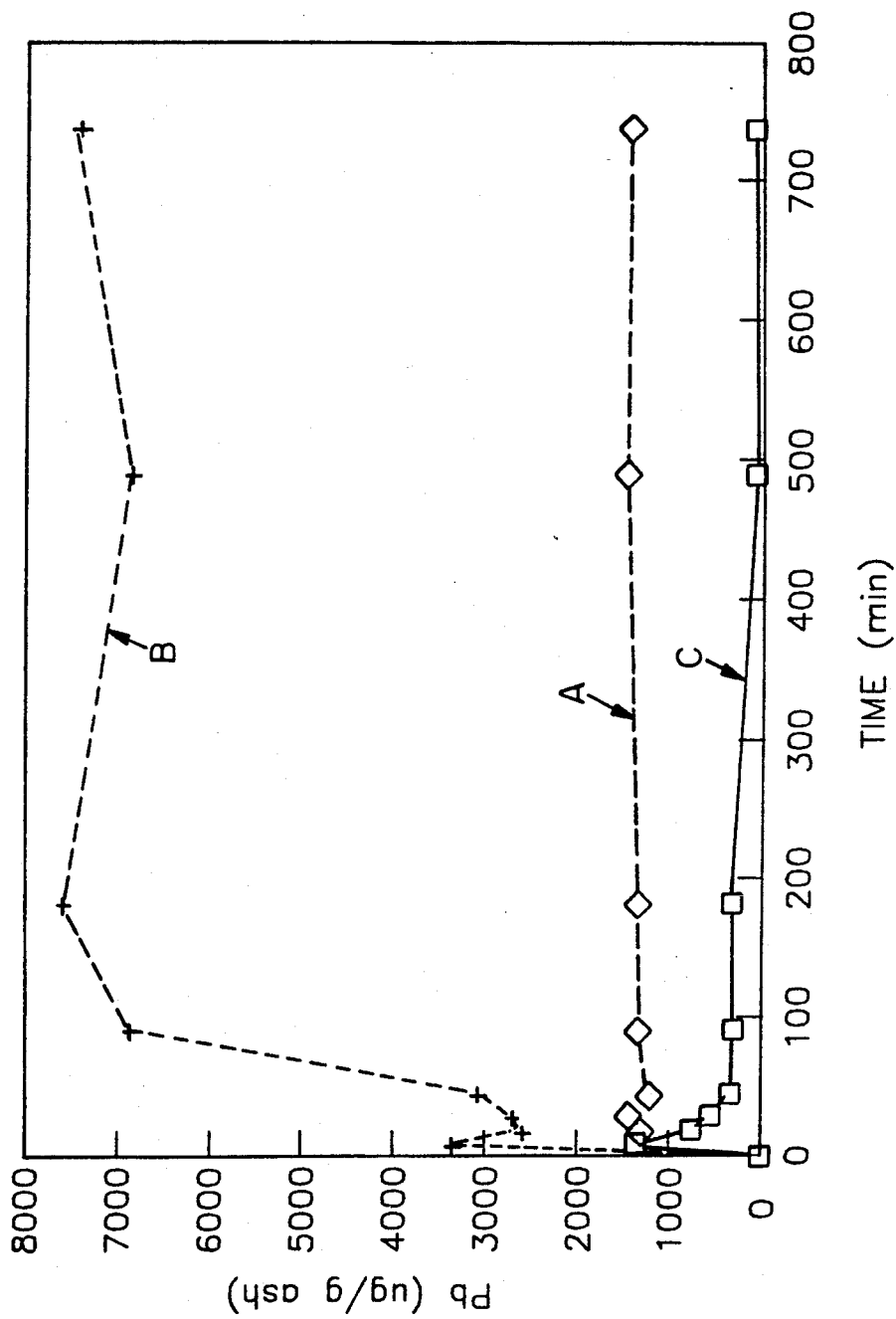
FIG. 2 is a graph of lead concentration to equilibrium versus leaching time for air pollution control residues or scrubber residues.

Reference to FIG. 2 shows that for sample A, about 93% of the total lead was recovered in 10 minutes. Thus, the optimum extraction conditions for this sample were observed to be 10 minutes at pH 1.5.

For sample B, lead recovery took 90 minutes at an optimum observed pH of 2.65.

For sample C, lead concentration peaked in 10 minutes and then decreased. Thus, the optimum extraction conditions for this sample is 10 minutes at pH 1.7.

Figure 3:
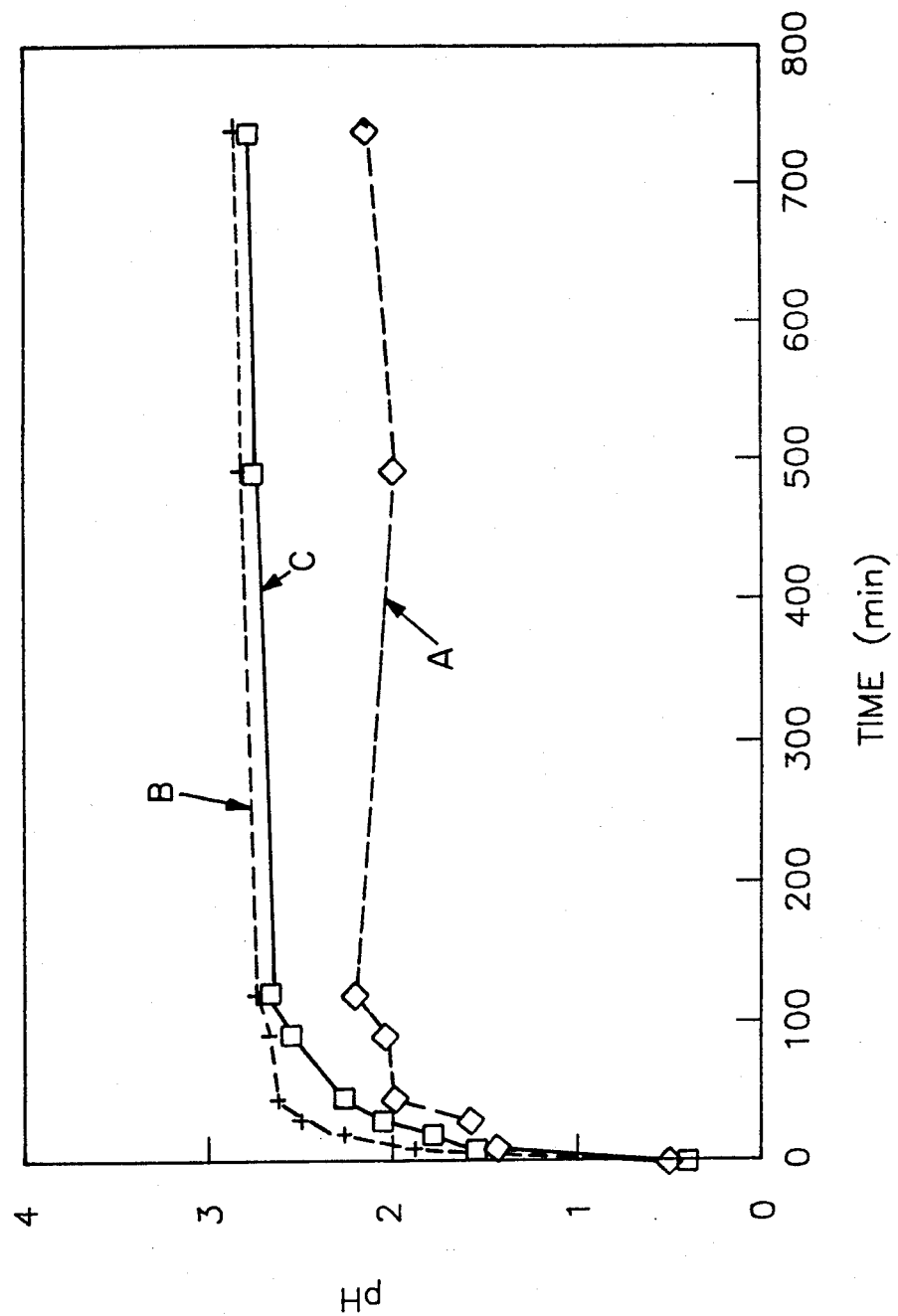
FIG. 3 is a graph of pH versus time for air pollution control residues or scrubber residues.
Figure 4:
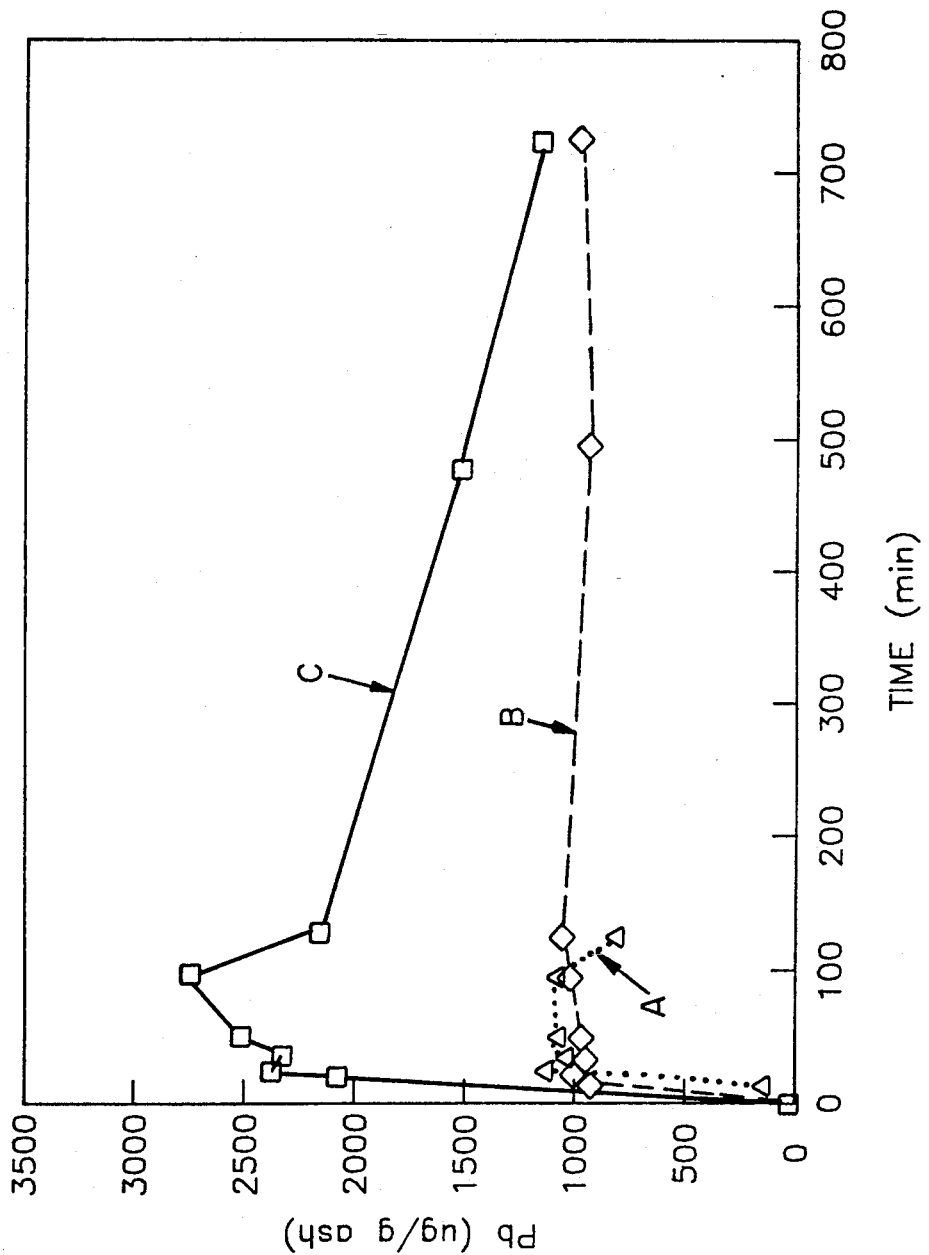
FIG. 4 is a graph of lead concentration from the fine particulates fraction of bottom residue or combined air pollution control residue and bottom residue versus time.

A typical kinetics study is shown in FIGS. 3 and 4, which shows that lead extraction was quite different for different residues. This underscores the need for determining the optimum reaction time at the optimum pH for each air pollution control residue batch. The reaction conditions should be adjusted as the source of the residue being treated changes.

EXAMPLE 3

Determination of Optimum Recycle Ratio

The solubility at the optimum pH as determined for samples A, B and C as in Example 1 to determine the optimum recycle ratio for a continuous extraction process. Samples of 1 gram of residue in 20 ml of extractant solution, at a pH of 2 for sample A and a pH of 3 for samples B and C, were stirred for the optimum reaction time. The reaction was stopped by separating the solid and liquid phases by vacuum filtration. New air pollution control residue samples were added to the extractant solution at the 1 gram to 20 ml level. The process was repeated for six cycles.

Figure 5:
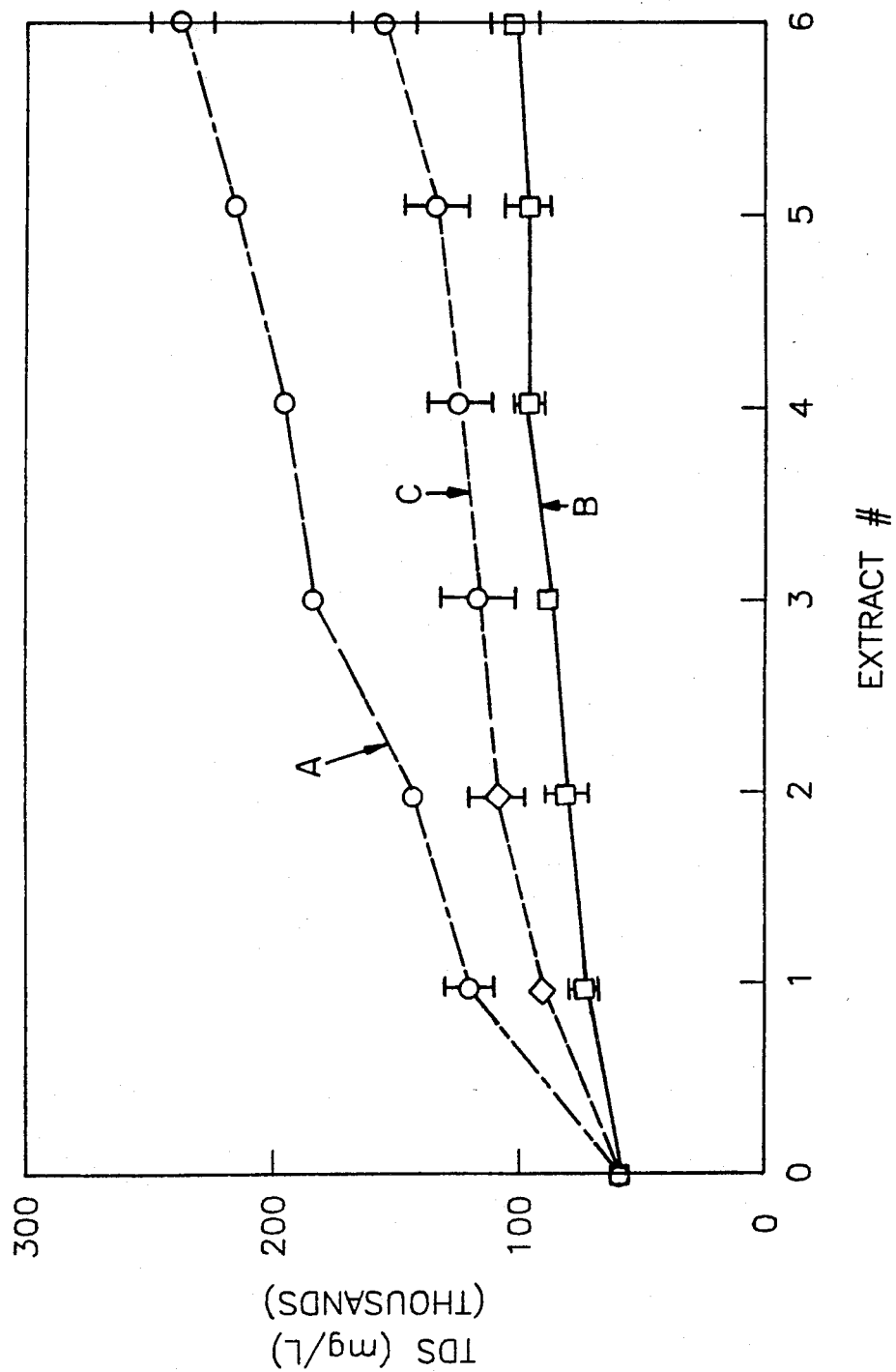
FIG. 5 is a graph of the total dissolved solids versus number of recycles for air pollution control residues or scrubber residues.

The total dissolved solids generally increased with each reaction cycle. Sample A contained the most dissolved solids, as can be seen in FIG. 5. Reference to FIG. 5 shows that Sample A had an increased total dissolved solid content after each cycle from 123,500 mg/l to 242,400 mg/l after six cycles. The total dissolved solids for samples B and C Were 160,000 mg/l and 104,600 mg/l respectively after six cycles.

Figure 6:
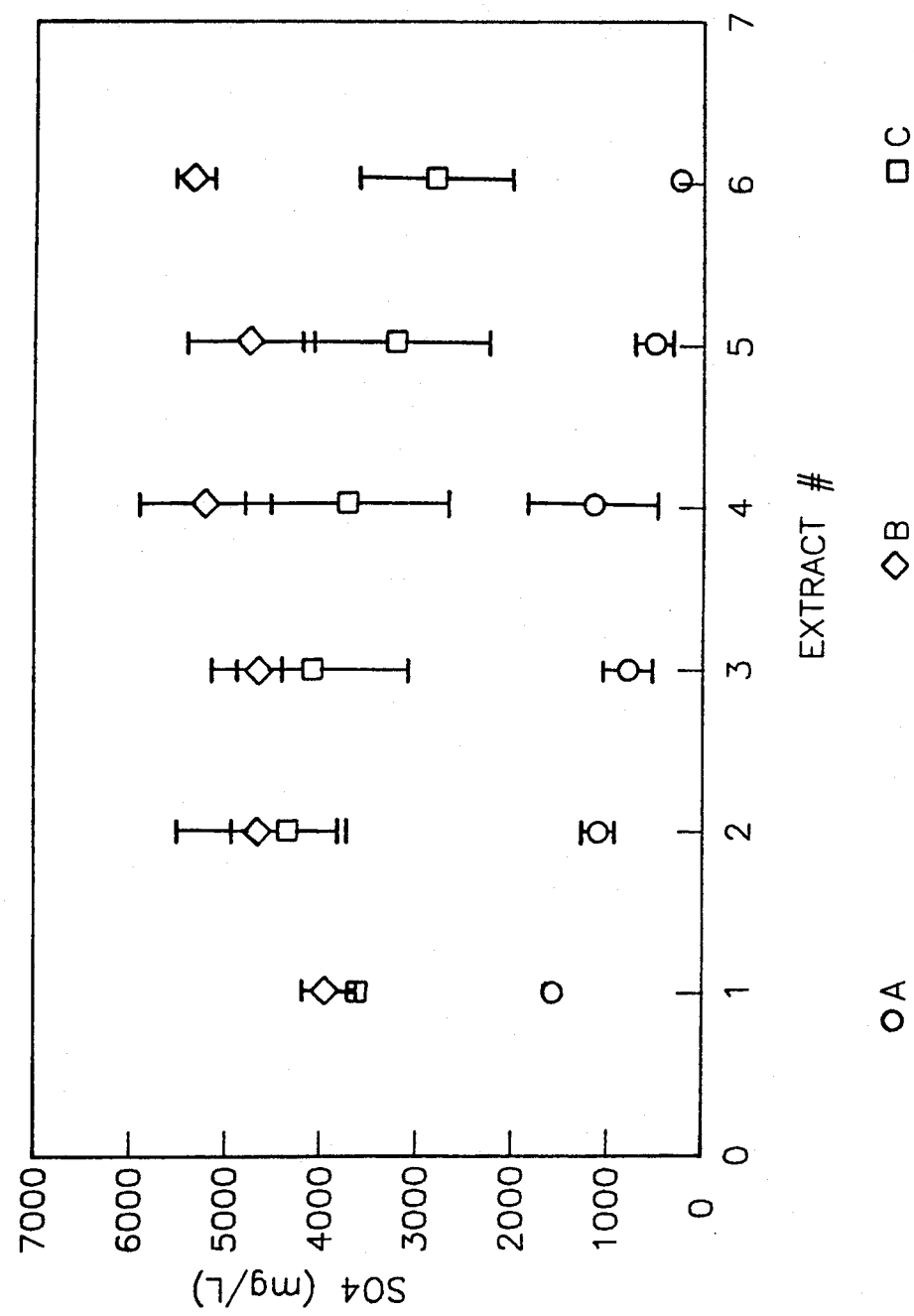
FIG. 6 is a graph of sulfate concentration versus number of recycles for air pollution control residues or scrubber residues.
Figure 7:
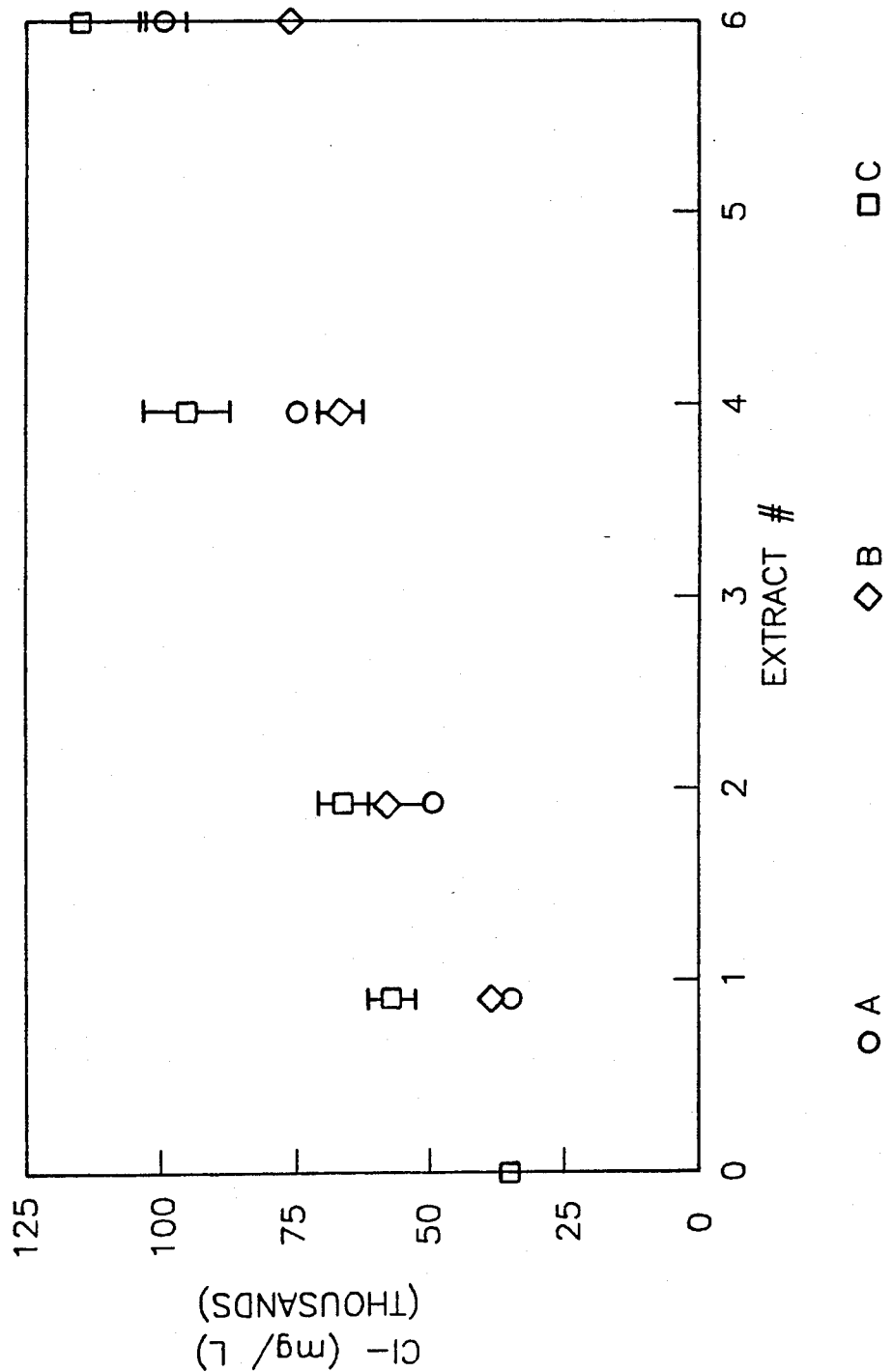
FIG. 7 is a graph of chloride concentration versus number of recycles for air pollution control residues or scrubber residues.

As is shown in FIGS. 6 and 7, the nature of the anions present also varied widely among the three residues. Sample C had the highest sulfate concentration, 5400 mg/l, whereas sample B contained about 4000 mg/l and sample A only contained about 1000 mg/l. The chloride concentration was highest for sample B at about 100 mg/l after four cycles, compared to about 80 mg/l for sample A and about 70 mg/l for sample C.

Figure 8:
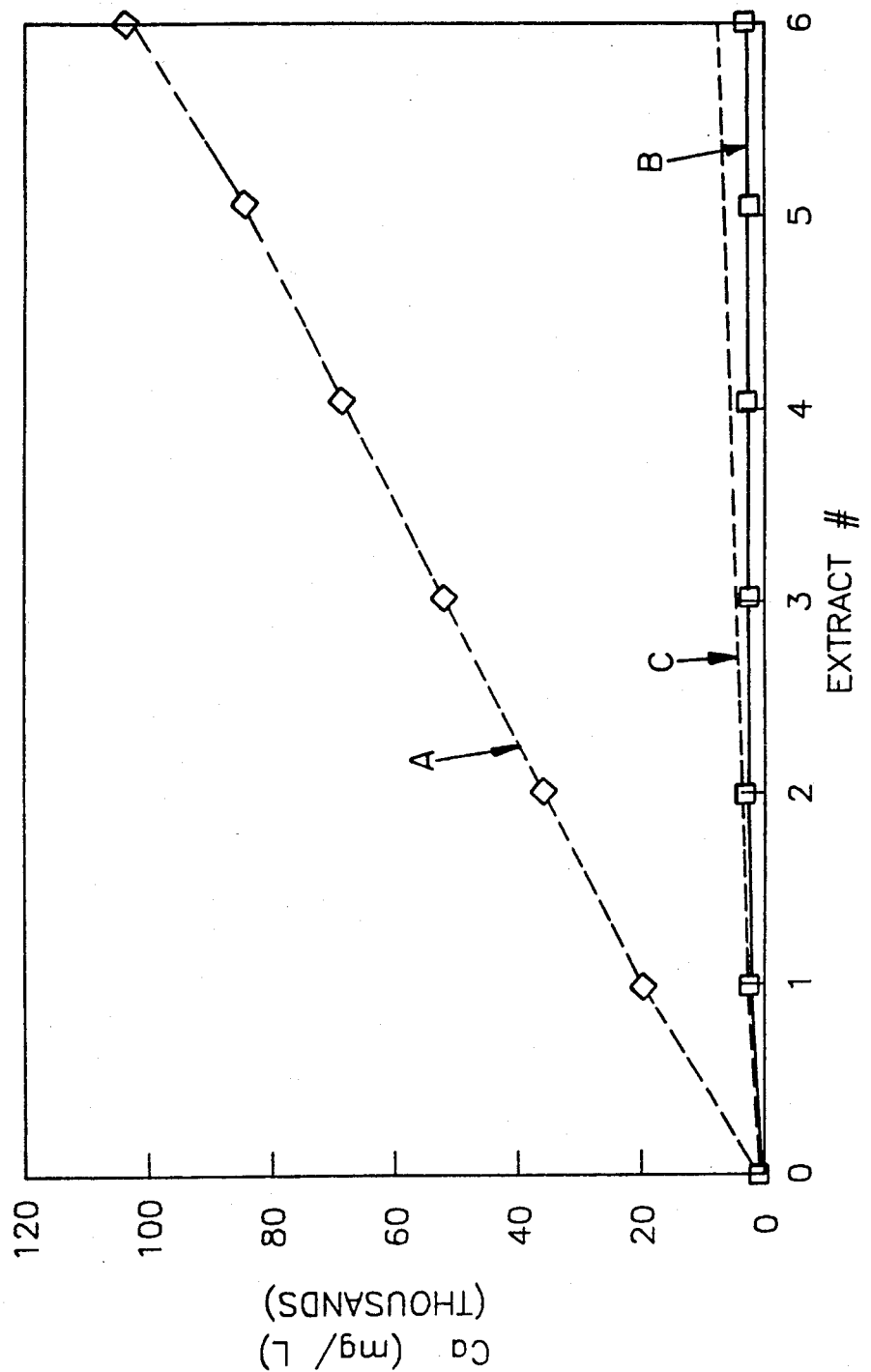
FIG. 8 is a graph of calcium concentration versus number of recycles for air pollution control residues or scrubber residues.
Figure 9:
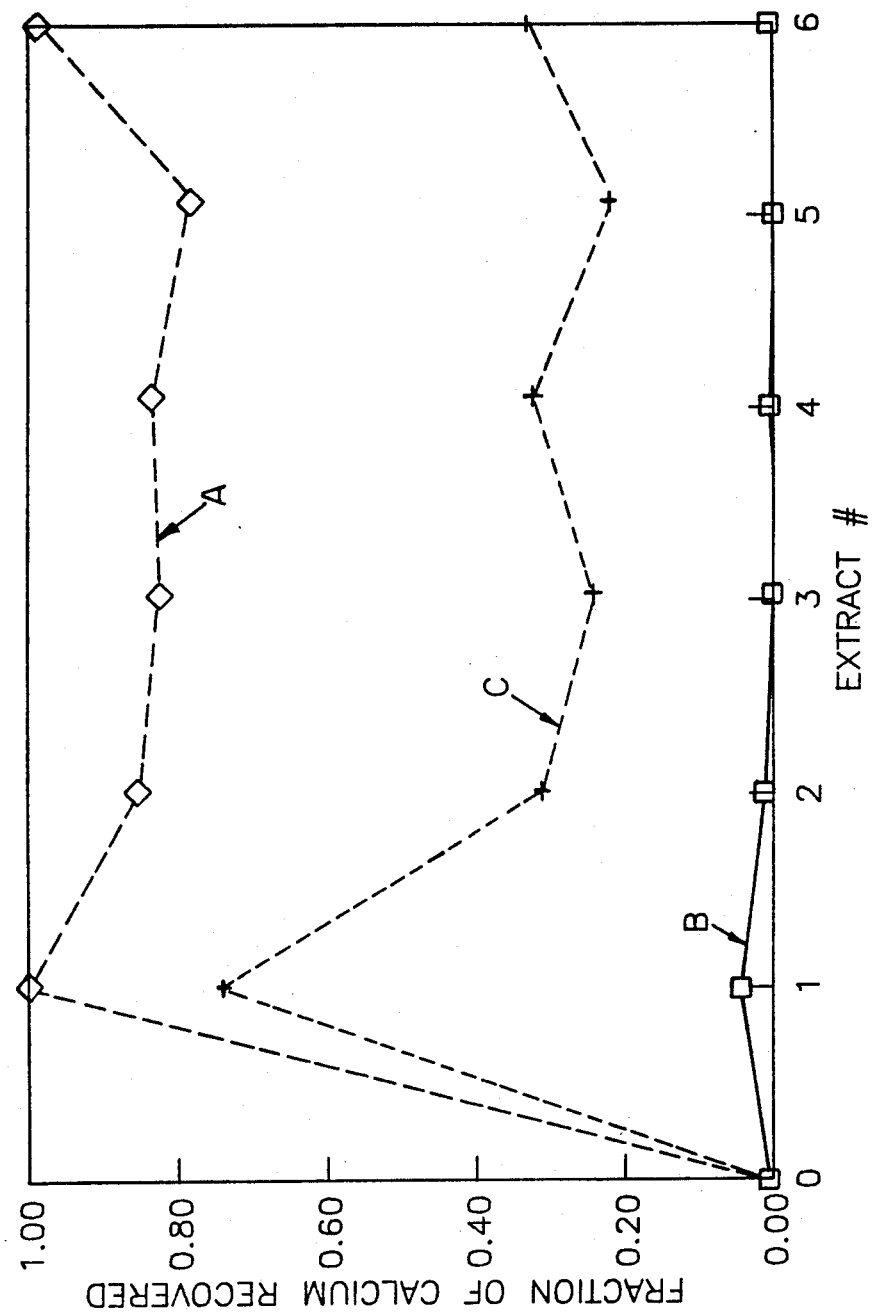
FIG. 9 is a graph of extraction efficiency versus number of recycles based on calcium recovery.

The concentration of calcium also varied widely among the three residue samples, as shown in FIG. 8. Sample A had by far the highest concentration of calcium and the concentration increased with each extract cycle; whereas samples B and C had far less soluble calcium. FIG. 9 shows the extraction efficiency after each extract cycle. Sample A consistently recovered 80-100% of the calcium present, whereas sample B recovered from about 20-80%, the maximum being after the first cycle. Very little calcium was extractable for sample C. It is concluded that the calcium is present in insoluble form for sample C and in highly soluble form for sample A.

Figure 10:
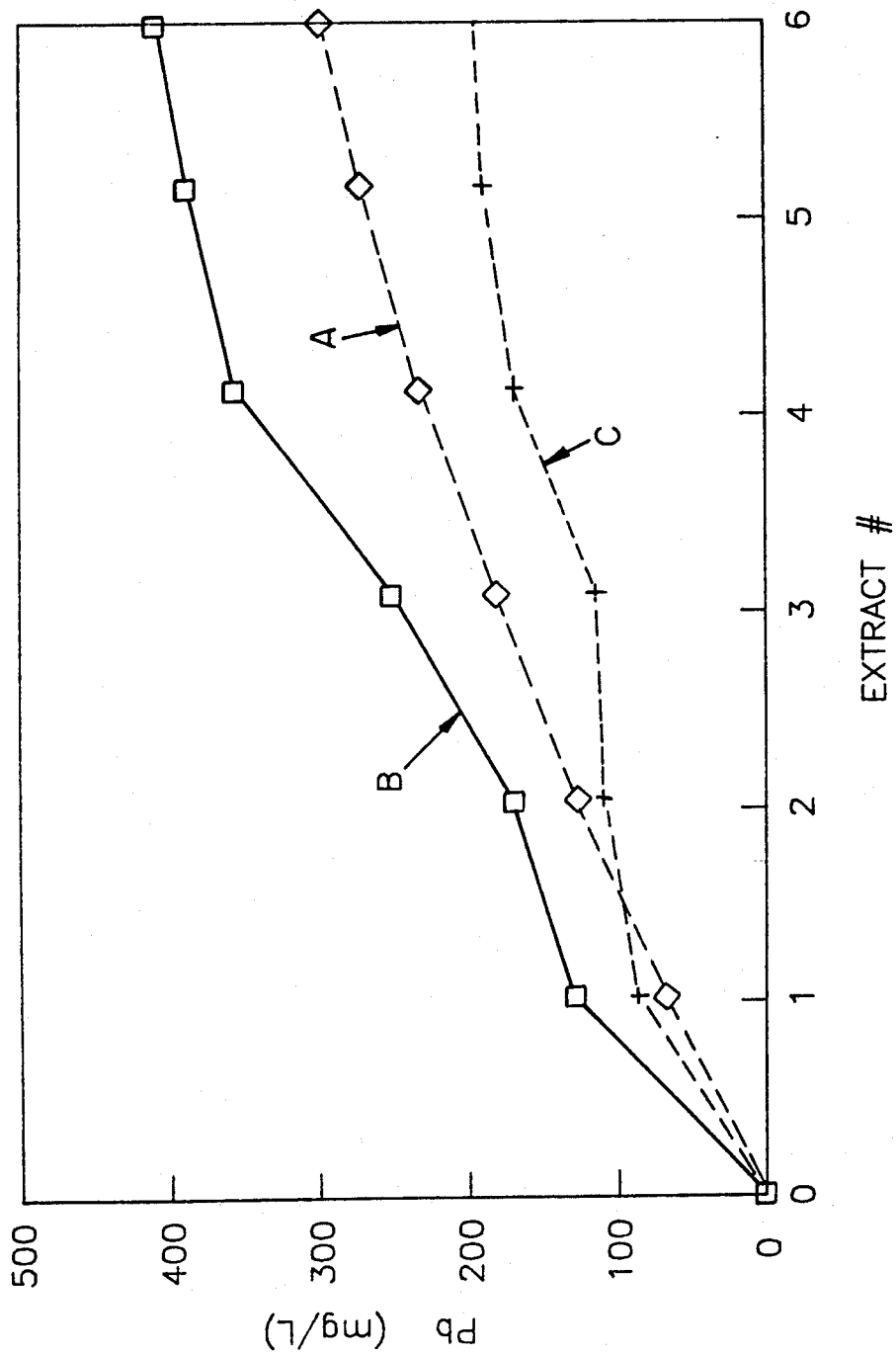
FIG. 10 is a graph of extraction efficiency versus number of recycles based on lead recovery.
Figure 11:
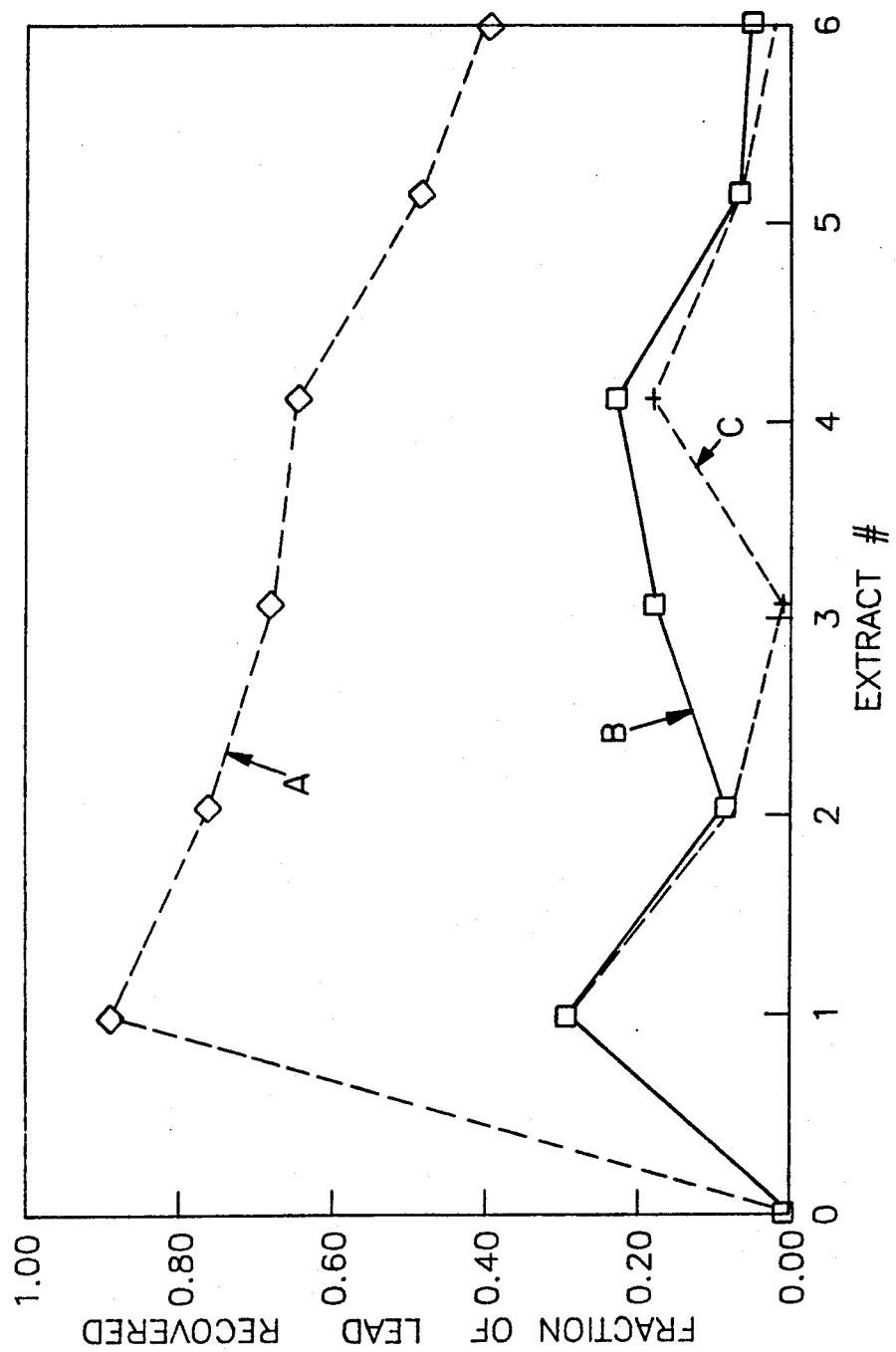
FIG. 11 is a graph of lead recovered per number of recycles.

The concentration of lead increases with each cycle for all samples, see FIG. 10. As can be seen in FIG. 11, about 30% of the lead is removed after 1 cycle for samples B and C, but 90% was removed for sample A; however, a drop in removal was noted after cycle 4. Thus, an optimum recycle for sample A would control the extractant concentration at the conditions of the third extract cycle.

Since the extraction of calcium was so variable, the lead concentration data is chosen as the criteria to determine optimum recycle conditions. Thus, for sample A, an optimum recycle ratio would control the extractant concentration at the conditions of the third extract cycle for lead, and is calculated using the lead concentrations at this point. The lead concentration of lead after four cycles would be used for samples B and C.

Figure 12:
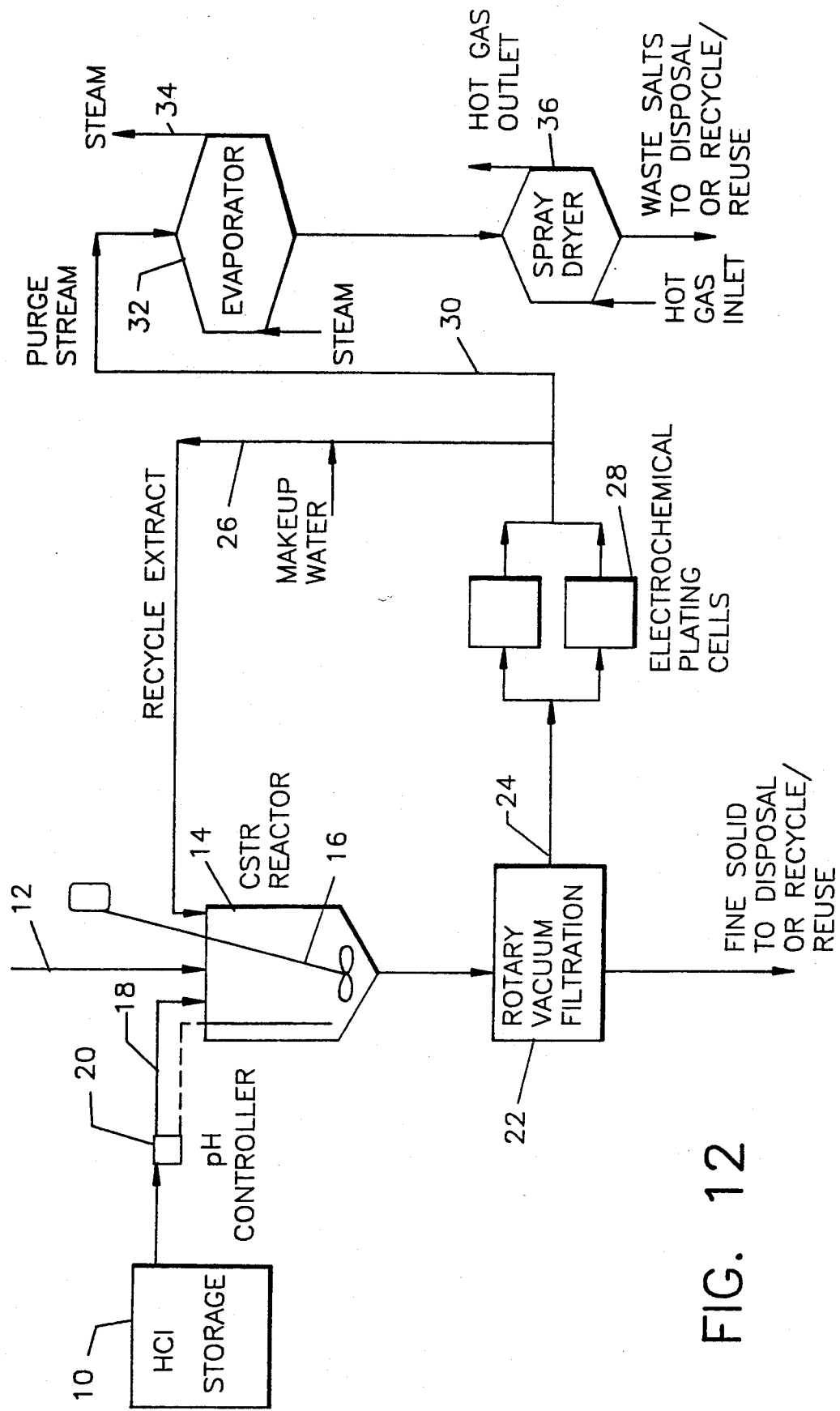
FIG. 12 is a block diagram of a suitable continuous extraction treatment plant for recovery of heavy metals and dissolved salts.

The procedure of Examples 1-3 can be used to determine optimum operation of a suitable continuous air pollution control residue treatment plant as shown in FIG. 12.

An air pollution control residue feed stream 12 is fed to an extractant container 14 containing a stirrer 16. Extraction solution at the predetermined optimum pH is also fed to the container 14 through line 18. HCl storage unit 10 provides acid for A pH controller 20 which is in the line 18. After the predetermined cycle time, the resultant slurry is fed to a rotary vacuum filter 22 wherein the residue solids are collected.

The extractant solution is pumped through line 24 and can be recycled through line 26 back to the extractant container 14. Makeup water and pH adjustment can be performed at this stage prior to treating the next batch of air pollution control residue. The extractant solution will also be analyzed to determine anion, cation, total solids and pH. After a predetermined number of cycles, determined as in Example 3, when the metal concentration in the extractant solution is adequate, the extractant solution can be pumped to one or more electroplating cells 28 where particular metals are plated out. A portion of the extractant solution is recycled through line 26 back to the extractant container 14 and a portion is pumped through line 30 through evaporator 32 and to a spray dryer 36. The water is removed as steam through line 34 and can be used as is or cooled and recycled as makeup water to the container 14. The precipitated salts, now free of hazardous metals, can be collected through line 34 for reuse or disposal.

In order to avoid any contamination of the extractant solution by the extracting equipment, the containers, hoses and the like are preferably made of inert materials such as plastics. In order to provide efficient extraction, a high speed stirrer is provided in the extracting container.

EXAMPLE 4

Continuous Extraction of Metals

Referring to FIG. 12, air pollution control residue obtained from source C was fed through line 12 to a continuously stirred tank reactor 14 at a rate of 1 kg/hr. Extractant solution (1.0N NaCl acidified with HCl to a pH of 3.0) was fed to the tank reactor at a rate of 20 kg/hr, maintaining a 1 gm residue:20 ml solution ratio. The pH was monitored by means of the pH controller 20 and when it reached about 1.59, the contents of the reactor 14 were filtered on a 20-25 micron cellulose filter 22 and the solids collected. The filtrate was passed via line 24 into a series of electrochemical cells 28 to remove lead and cadmium and then recycled to the tank reactor via line 26.

What is claimed is:

1. A method for continuously treating air pollution control residue with an extractant salt solution to remove lead, cadmium, chromium, cobalt, calcium, copper, aluminum, nickel, zinc, metal sulfates and metal chlorides therefrom, wherein said residue is from a single source and is comprised of variable compositions, said method comprising the steps of:

a) adjusting the pH of the salt solution to a value between 1 and 12; extracting lead therewith from a sample of said residue and measuring the percentage amount of the extracted lead relative to the original amount of lead in said sample;

b) continuing to adjust the pH of the salt solution to different values in a range between 1 and 12 and extracting lead therewith from additional samples of said residue, at different pH values respectively within said range, until a maximum percentage amount of extracted lead relative to the original amount of lead in the respective sample is obtained, at a specific pH value, within said range;

c) extracting lead from another sample of the residue, with the salt solution, at the specific pH value, for a period of time sufficient to reach a maximum state of lead extraction;

d) recycling the salt solution at the specific pH value by successively extracting lead from successive additional samples for a number of times until the percentage amount of extracted lead relative to the original amount of lead in a respective sample declines from the percentage amount of extracted lead, relative to the original amount of lead, in the preceding sample;

e) continuously extracting lead from a successive number of batches of the residue equal to one less than said number of times, with the salt solution at the specific pH value, and for said period of time for each batch; and f) continuously extracting at least one of the members of the group consisting of cadmium, chromium, cobalt, calcium, copper, aluminum, nickel, zinc, metal sulfates and metal chlorides, from a successive number of batches of the residue equal to one less than said number of times, with the salt solution at the specific pH value, and for said period of time for each batch.

2. A method according to claim 1 wherein said residue is selected from one or more of the group consisting of air pollution control residue and fines from bottom residue.

3. A method according to claim 1 wherein, after the continuous extraction of lead and at least one of the members of said group, from a successive number of batches of the residue equal to one less than said number of times, metals are removed from said salt solution by electrochemical recovery.

4. A method according to claim 3 wherein, after the continuous extraction of lead and at least one of the members of said group, from a successive number of batches of the residue equal to one less than said number of times, salts are removed from said salt solution, from which metals have been removed, by drying said salt solution.

5. A method according to claim 8 wherein the pH of said salt solution is adjusted to the specific pH between extracting of lead between successive batches.

6. A method for continuous extraction treatment of incineration residues to recover soluble trace metals, consisting of cadmium, chromium, cobalt, calcium, copper, aluminum, nickel, and zinc, which comprises:

a) treating said residues in a suitably buffered acid solution at an acid pH which provides for maximum lead extraction from said residues and for a reaction time for lead extraction to reach; a maximum state; to form a slurry, b) filtering the slurry to separate out extracted solids from the extraction solution, and c) recycling the extracting solution to treat additional residues for lead extraction for a number of cycles until there is a decline in percentage of lead extraction.

7. A method according to claim 6 wherein the extraction solution is treated electrochemically to isolate trace metals.

* * * * *